(12) United States Patent
Bennett et al.

(10) Patent No.: US 11,022,370 B2
(45) Date of Patent: Jun. 1, 2021

(54) BELT DRYER ARRANGEMENT FOR DRYING AN AQUEOUS POLYMER GEL AND FOR COMMINUTING THE DRIED POLYMER GEL TO FORM DRIED POLYMER PARTICLES, AND METHOD FOR DRYING AN AQUEOUS POLYMER GEL AND FOR COMMINUTING THE DRIED POLYMER GEL TO FORM DRIED POLYMER PARTICLES

(71) Applicant: BASF SE, Ludwigshafen (DE)

(72) Inventors: Andrea Karen Bennett, Ludwigshafen (DE); Paul Walter McCormack, Ludwigshafen (DE); Mark Elliott, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 106 days.

(21) Appl. No.: 16/317,179

(22) PCT Filed: Jul. 4, 2017

(86) PCT No.: PCT/EP2017/066633
§ 371 (c)(1),
(2) Date: Jan. 11, 2019

(87) PCT Pub. No.: WO2018/011018
PCT Pub. Date: Jan. 18, 2018

(65) Prior Publication Data
US 2019/0226763 A1 Jul. 25, 2019

(30) Foreign Application Priority Data
Jul. 15, 2016 (EP) .................................. 16179778

(51) Int. Cl.
*F26B 17/04* (2006.01)
*B01J 20/30* (2006.01)
*B01J 20/291* (2006.01)
*C08F 6/06* (2006.01)
*C08F 220/18* (2006.01)

(52) U.S. Cl.
CPC ............. *F26B 17/04* (2013.01); *B01J 20/291* (2013.01); *B01J 20/3021* (2013.01); *B01J 20/3078* (2013.01); *C08F 6/06* (2013.01); *C08F 220/18* (2013.01); *B01J 2220/68* (2013.01); *C08F 2500/24* (2013.01); *F26B 2200/08* (2013.01)

(58) Field of Classification Search
None
See application file for complete search history.

(56) References Cited

U.S. PATENT DOCUMENTS

| 4,138,539 | A | 2/1979 | Landolt et al. |
| 4,417,697 | A | 11/1983 | Saiki et al. |
| 4,559,235 | A | 12/1985 | Miller |
| 5,668,252 | A | 9/1997 | Yokoi et al. |
| 2014/0314473 | A1 | 10/2014 | Stephan |

FOREIGN PATENT DOCUMENTS

| WO | WO-2013/072419 A1 | 5/2013 |
| WO | WO-2014/044780 A1 | 3/2014 |
| WO | WO-2015/074966 A1 | 5/2015 |
| WO | WO-2015/163512 A1 | 10/2015 |

OTHER PUBLICATIONS

Buchholz, Fredric L., et al. *Modern Superabsorbent Polymer Technology*, "Commercial Processes for the Manufacture of Superabsorbent Polymers." New York: John Wiley & Sons, Inc., 1998, pp. 71-103.
*Ullmann's Encyclopedia of Industrial Chemistry*. 6th, completely revised edition. Weinheim, Germany: Wiley-VCH, 2003, vol. 35, pp. 73-93.
International Search Report for PCT Patent Application No. PCT/EP2017/066633, dated Oct. 4, 2017.

*Primary Examiner* — Robert T Butcher
(74) *Attorney, Agent, or Firm* — Marshall, Gerstein & Borun LLP

(57) ABSTRACT

A belt drier arrangement for drying an aqueous polymer gel and for comminuting the dried polymer gel to give dried polymer particles, having: a belt drier having a drier setup and a conveyor belt for receiving and for drying the aqueous polymer gel to give a dry cake or fragments on a receiving surface of the conveyor belt, and a comminution arrangement, disposed downstream of the drier setup in product flow direction, for comminution of the dried polymer gel of the dry cake or fragments to give dried comminuted polymer particles. The comminution arrangement has a comminutor in the form of a milling drum which is disposed with an upper working line of a working edge of the milling drum at the level of or above a receiving surface of a conveyor belt, for mill processing of the dry cake or of the fragments, where the milling drum is designed to eject comminuted dried polymer particles of the dry cake or of the fragments in the downward direction.

20 Claims, 7 Drawing Sheets

Figure 1:
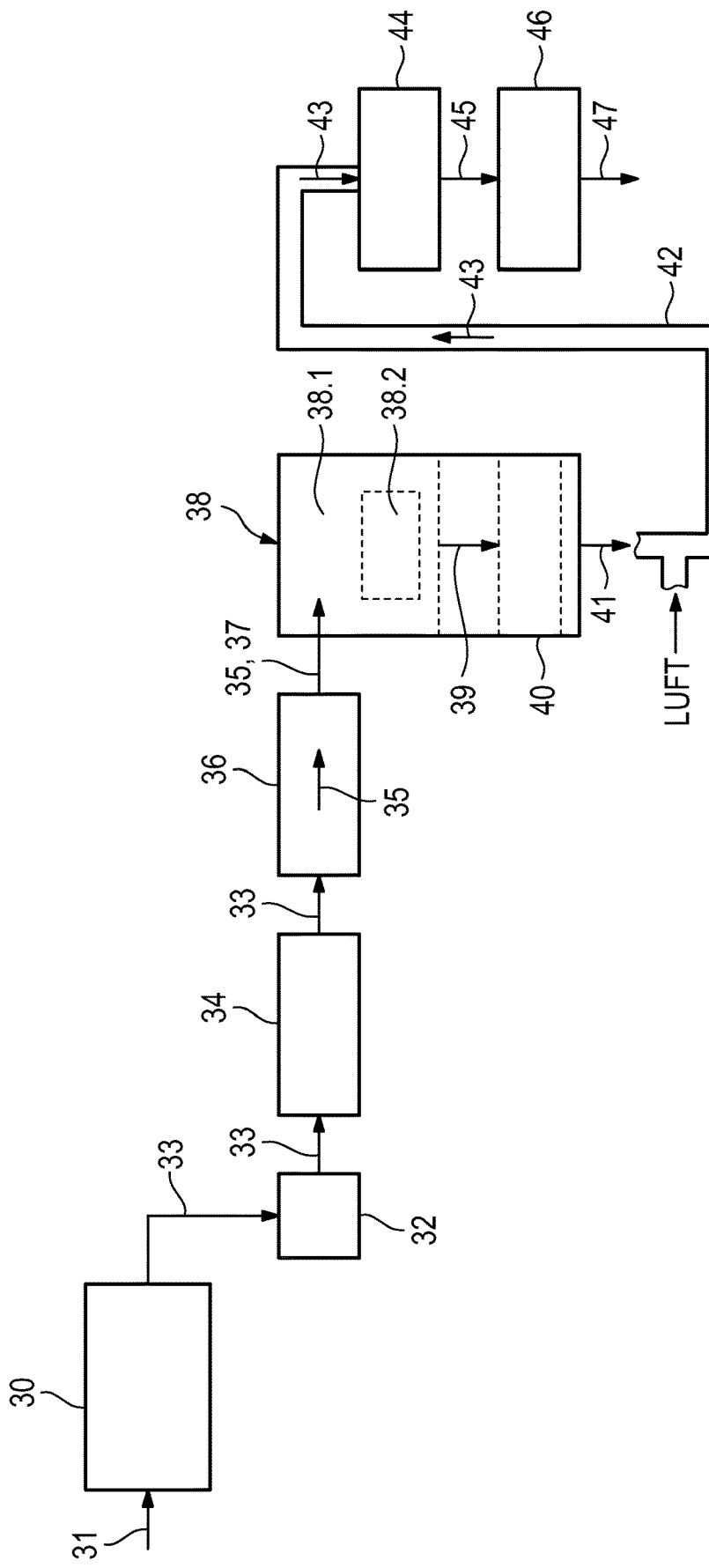

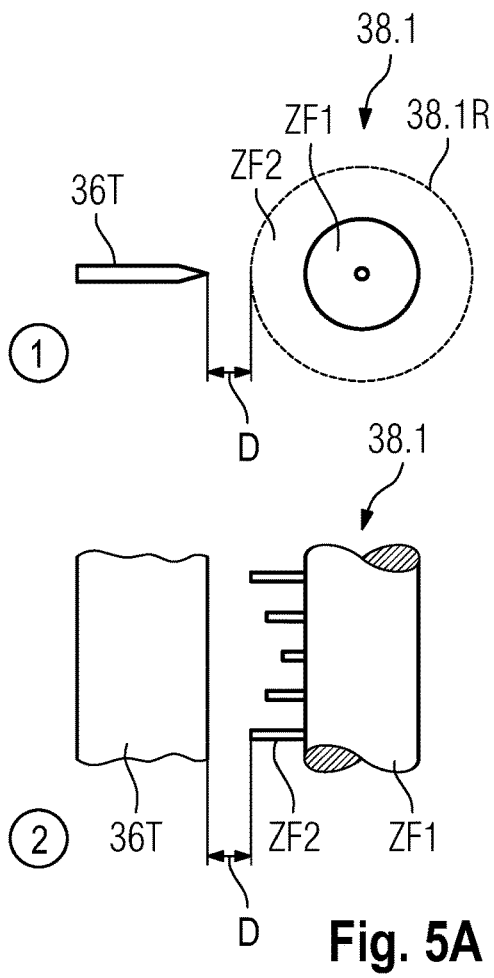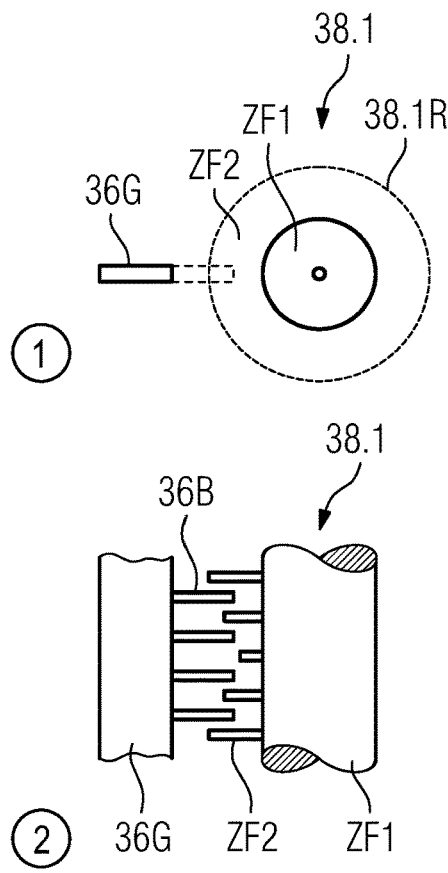
Fig. 5A  Fig. 5B
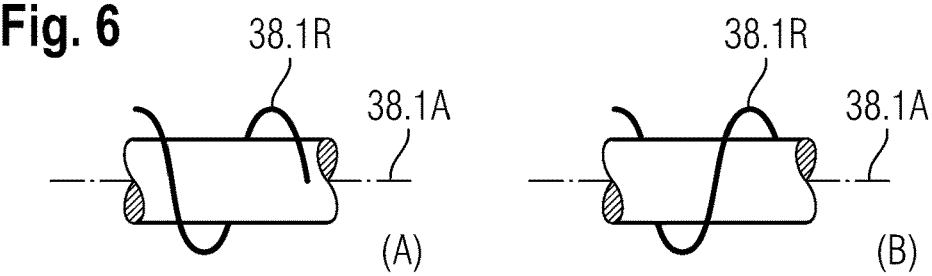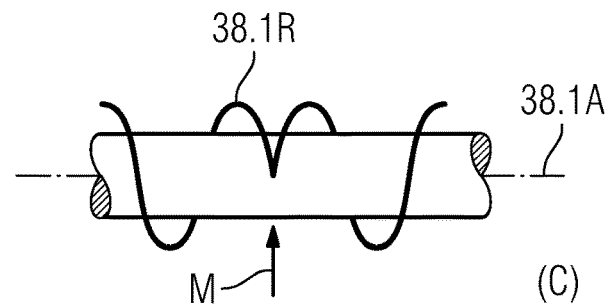

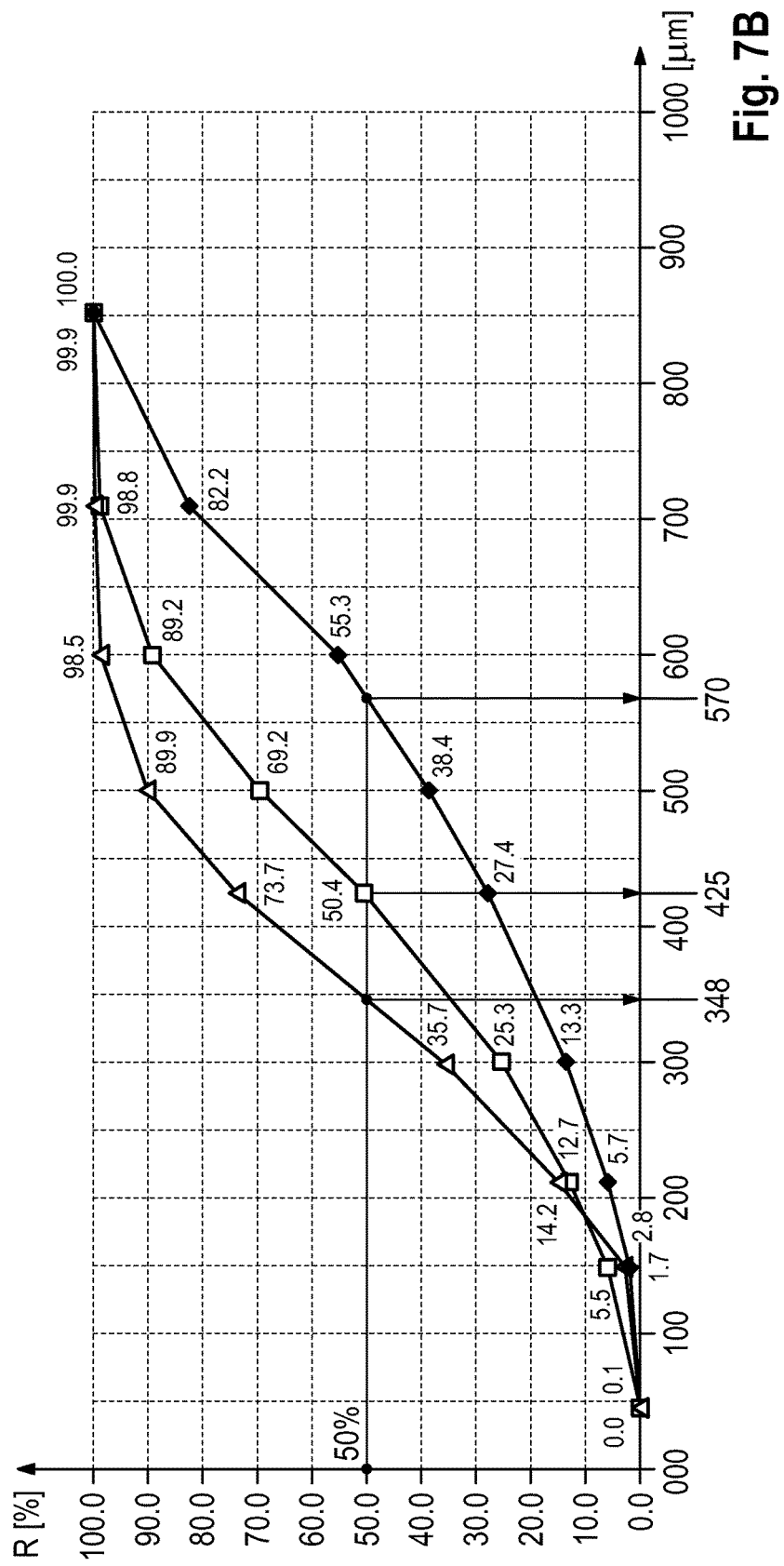

BELT DRYER ARRANGEMENT FOR DRYING AN AQUEOUS POLYMER GEL AND FOR COMMINUTING THE DRIED POLYMER GEL TO FORM DRIED POLYMER PARTICLES, AND METHOD FOR DRYING AN AQUEOUS POLYMER GEL AND FOR COMMINUTING THE DRIED POLYMER GEL TO FORM DRIED POLYMER PARTICLES

CROSS-REFERENCE TO RELATED APPLICATIONS

This is the U.S. national phase of International Application No. PCT/EP2017/066633, filed Jul. 4, 2017, which claims the benefit of European Patent Application No. 16179778.2, filed Jul. 15, 2016.

The invention relates to a belt drier arrangement for drying an aqueous polymer gel and for comminuting the dried polymer gel to give dried polymer particles according to the preamble of claim 1. The invention further relates to a method of drying an aqueous polymer gel and of comminuting the dried polymer gel to give dried polymer particles according to the preamble of claim 19 and to a production method according to claim 20.

Water-absorbing or superabsorbent polymers (SAPs, called superabsorbents for short) refer to crosslinked hydrophilic polymers that can absorb several times their mass in the dry state (sometimes more than one thousand times) of liquids, for example water or similar liquids.

The main field of use of superabsorbents is in the hygiene sector and also plays a major role in the medical sector in wound dressings and plasters. Further important fields of use for superabsorbents are agriculture and horticulture, where superabsorbents are used in order to improve the ability of soil to store moisture.

The demands on a superabsorbent depend on the particular field of use, and for that reason the properties of the superabsorbents (for example the degree of swelling and the swelling rate) have to be adjusted correspondingly. A matter of significance for this purpose is whether the absorption of the liquid to be absorbed is to take place at relatively high temperature and/or under pressure, which is especially important for the use of superabsorbents in incontinence products. Other matters of major significance are the nature and composition of the liquid to be absorbed, since the degree of swelling of a superabsorbent is significantly affected by the salt content of the swelling agent.

The water-absorbing polymers are especially polymers formed from (co)polymerized hydrophilic monomers, graft copolymers of one or more hydrophilic monomers on a suitable graft base, crosslinked cellulose or starch ethers, crosslinked carboxymethylcellulose, partly crosslinked polyalkylene oxide, or natural products swellable in aqueous liquids, for example guar derivatives. Water-absorbing polymers of this kind are used to produce diapers, tampons and sanitary napkins, but also as water-retaining agents in market gardening.

A production method for water-absorbing polymer particles has the steps of: polymerizing an aqueous monomer solution or suspension for production of a polymer gel; drying the aqueous polymer gel in a belt drier with a conveyor belt by applying the aqueous polymer gel to the conveyor belt and conveying the polymer gel on the conveyor belt in a conveying direction; crushing and/or grinding the dried polymer gel to give polymer particles.

The production of the water-absorbing polymers is described, for example, in the monograph "Modern Superabsorbent Polymer Technology", by F. L. Buchholz and A. T. Graham, Wiley-VCH, 1998 or in Ullmanns "Encyclopedia of Industrial Chemistry", 6th edition, volume 35, pages 73 to 103.

For drying, a belt drier, especially in the form of an air circulation belt drier for guiding circulated air, is designed with a drier setup essentially comprising the conveyor belt and with an air recycling conduit downstream of the drier setup for air recycling. Recycled air is withdrawn here from the drier setup and fed back to the drier setup via the air recycling conduit. The air recycling conduit has an air withdrawal conduit formed between an upstream intake section relative to air flow direction in the drier setup and a downstream discharge section relative to air flow direction in the air recycling conduit. A superabsorbent polymer in the aqueous polymer gel state is regarded as being in a wet state and hence can also be referred to in general terms as wet material; in other words, the aqueous polymer gel still has a considerable proportion of water before drying; especially as described below. The aqueous polymer gel is obtained by polymerizing a monomer solution or suspension. The aqueous polymer gel of still-aqueous polymer particles is preferably introduced into the belt drier in granular form, for example with a solids content of 40-60%. In this state, the polymer gel is basically already in crosslinked form with a desired degree of crosslinking, especially in homogeneously crosslinked form at first, especially with a comparatively low degree of crosslinking, especially barely surface crosslinked at all at first.

A superabsorbent polymer in a water-absorbing polymer particle state is considered to be in a state after drying; in other words, it has a low residual water content of the polymer particles after the drying of the aqueous polymer gel, especially as described below; the superabsorbent polymer is thus preferably in the form of a dried polymer gel, especially dried polymer particles. In this state, the water-absorbing polymer particles can preferably be postcrosslinked, especially surface crosslinked, in which case the degree of surface crosslinking is preferably above the abovementioned comparatively low degree of initially homogeneous crosslinking. Preferably, after the polymerization, an aqueous polymer gel of the water-absorbing polymers is obtained, which is dried. The principles of drying of the aqueous polymer gel to give a water-absorbing polymer comprising water-absorbing, especially dried, polymer particles is likewise described in the monograph "Modern Superabsorbent Polymer Technology", by F. L. Buchholz and A. T. Graham, Wiley-VCH, 1998, on pages 87 to 93.

In the belt drier, the aqueous polymer gel is dried to give a partly dried polymer gel and hence takes the form of a dry cake. The dry cake preferably takes the form of a strand of partly dried polymer gel, i.e. of a partly dried polymer strand, on the belt of the belt drier which thus extends through the drier setup of the belt drier.

The dry cake, at the end of the belt drier, i.e. on leaving the drier setup, is in the form of a substantially dried strand of dried polymer gel, for instance in the form of a slab or of a boardlike strand, i.e. of a dried polymer strand. The partly dried polymer gel and the dried polymer gel of the dry cake are sometimes already referred to hereinafter by the terminology "dried polymer particles"; both cases are covered by the terms "superabsorbent or water-absorbing polymer gel" or "dried polymer gel", as opposed to "aqueous polymer gel".

An introduction module in the belt drier serves to introduce the superabsorbent polymer in the form of the aqueous polymer particles. In practice, the drying conditions are then chosen that constitute a compromise between exploitation of the drier capacity and the processibility of the water-absorbing polymer particles. Compared to other designs of drier, the belt drier has the advantage that (apart from gravity) there is no significant mechanical stress that impairs the product, since the aqueous polymer gel or the water-absorbing polymer particles lie loose on a conveyor belt. In principle, a belt drier offers the option of configuring the construction of one or more control zones by means of one or more drier zones.

A belt drier comprises, for example, a product application module for a polymer input, a number of drier modules for formation of one or more drier zones, and a discharge module for a polymer output. A discharge module serves to discharge the superabsorbent polymer in the form of the water-absorbing polymer particles; more particularly, the conveyor belt ends, or has a turning point, in the discharge module. In the discharge module at the end of the belt drier, the superabsorbent polymer can fall onto or be supplied to a crusher or similar comminutor. For this purpose, the dry cake as a whole can be supplied to the comminutor, or as fragments of the dry cake or as some other coarse lumps of the dry cake. Some of the dried and as yet uncomminuted polymer particles in that case take the form of crushed dried polymer gel, for example comparatively coarse lumps, and some take the form of unavoidable crush residue of dried polymer gel.

What are formed thereafter are entirely comminuted dried polymer particles of dried polymer gel via the comminuting in the comminutor. In particular, the crush residue of dried polymer gel and residues resulting from the comminuting comprise fine polymer particle powder comprising fine and ultrafine particles. After the comminuting, the dried and comminuted polymer particles are preferably introduced into a pneumatic conveying operation and sent to a grinding operation, i.e. processed further thereafter to give ground dried polymer particles.

WO2015/163512 A1 elucidates a production method for water-absorbing polymer particles in which a polymer gel is dried. After the drying, the dried polymer gel is sent to a first grinding step in a first grinding apparatus, then to a dwell apparatus and then to a second grinding step in a second grinding apparatus. The dwell times in the first and second grinding apparatus are in the region of 3 minutes, and the dwell time in the dwell apparatus is 30 min or more, always well above a dwell time in a grinding apparatus. The dwell apparatus prevents clumped material from getting into the further conveying. In terms of particle sizes, the grinding is effected at 150 μm.

Particularly ground dried polymer particles can then be sent to a sieving operation. A midsize fraction then has an already preferred desired particle size and can be separated off at this early stage. An oversize fraction or fines fraction can optionally be ground, sieved or processed once again and added to the midsize fraction. The dried, ground and sieved polymer particles of the midsize fraction can be surface reprocessed. The dried, ground and sieved and surface reprocessed polymer particles can be subjected to safeguard screening.

In the drying operation, it is possible to use continuous convection belt driers; this relates hereinafter to a belt drier of the type specified at the outset, especially an air circulation belt drier. The belt drier specified at the outset is configured particularly for an aqueous polymer gel, especially for formation of a product of limited flowability in piece form. In a continuous belt drier, the product layer of an aqueous polymer gel as a polymer strand, applied in the form of an aggregate through which air can flow, on a perforated conveyor belt is transported through the drying space and dried in the process at first to give partly dried polymer gel and finally to give dried polymer gel in a dry cake; the latter is then processed further to give the abovementioned dried polymer particles as water-absorbing polymer particles.

The drying gas that flows through the product layer of the dry cake of partly dried polymer gel and then dried polymer gel serves both to introduce heat into the aqueous polymer gel to be dried or into the partly dried water-absorbing polymer particles and to transport evaporating moisture away. The drying gas used is preferably air as drying air. In an air circulation belt drier, the drying air that flows through the product layer is additionally conducted as circulating air.

Belt driers having transport belts are to be distinguished from belt reactors. While a belt reactor is used to produce aqueous polymer gel from its starting materials, a belt drier is used to produce water-absorbing polymer particles from an aqueous polymer gel, especially to produce the water-absorbing polymer particles mentioned, preferably from an aqueous polymer gel that has first been homogeneously crosslinked with the desired degree of crosslinking, and optionally also surface crosslinked.

WO2015/074966A1 describes a plate belt drier for superabsorbent polymers (SAPs, called superabsorbents for short) with a comminutor. Such a comminutor in the form of a cross-blade comminutor is known in principle and is used for comminution of SAPs and is commercially available. One example is apparent from the Grenzebach webpage: https://www.yumpu.com/de/document/view/6323642/thermische-verfahrenstechnik-grenzebach-maschinenbau-gmbh.

One of the applicant's cross-blade comminutors is described in principle in relation to SAP production in WO2013/072419. This cross-blade comminutor comprises a shaft on which a multitude of bars are accommodated. As well as the bars disposed on the shaft, the cross-blade comminutor comprises a multitude of fixedly mounted bars that mesh into interspaces between the bars disposed on the shaft. The poly(meth)acrylate lumps introduced into the comminutor fall onto the fixedly mounted bars and come to rest thereon. The bars that rotate with the shaft crush the lumps.

WO2014/044780A1 discloses, in general terms, a crusher in combination with an adjustable guiding means in the form of a grid that additionally brings about a certain reduction in size of SAP lumps.

What is desired is improved comminution of the dried polymer strand, i.e. of the dry cake or the coarse fragments of the dry cake, at the end of a conveyor belt of a belt drier to dried polymer particles. The reason for this is essentially that, firstly, the properties of the dried polymer gel with regard to hardness and consistency can vary and hence the comminution capacity of a comminutor is manifested to different degrees. Secondly, for pneumatic conveying—especially for pneumatic conveying with a grinding and/or sieving operation accommodated therein as an intermediate step—it is advantageous that a largely homogenized product stream of already well-comminuted polymer particles of the dried polymer gel is provided, and in particular can be introduced into the pneumatic conveying with comparatively constant parameters.

It is an object of the invention to specify an improved apparatus and an improved method for drying an aqueous polymer gel and for comminuting the dried polymer gel to give dried polymer particles. More particularly, the dried polymer gel in the form of a dry cake downstream of the drying or downstream of a belt drier is to be comminuted to give dried polymer particles in an improved manner. More particularly, the dried polymer particles, in the context of the improved comminution process for the dried polymer gel of the polymer strand, i.e. of the dry cake, are to be comminuted with a particle size distribution optimal/suitable for a subsequent pneumatic conveying and/or grinding operation. It is another object of the invention to specify an improved production method for production of water-absorbing polymer particles.

With regard to the apparatus, the object is achieved by the invention with a belt drier arrangement for drying an aqueous polymer gel and for comminuting the dried polymer gel to give dried polymer particles according to claim 1.

With regard to the belt drier arrangement for drying an aqueous polymer gel and for comminuting the dried polymer gel to give dried polymer particles, the starting point for the invention is that the belt drier arrangement has:

a belt drier having a drier setup and a conveyor belt for receiving and for drying the aqueous polymer gel to give a dry cake on a receiving surface of the conveyor belt, a comminution arrangement, disposed downstream of the drier setup in product flow direction, for comminution of the dried polymer gel of the dry cake or any fragments thereof to give dried comminuted polymer particles.

According to the invention, the comminution arrangement has a comminutor in the form of a milling drum which is disposed with an upper working line of a working edge of the milling drum at or above a receiving surface of a conveyor belt, for mill processing of the dry cake or of any fragments, where the milling drum is designed to eject comminuted dried polymer particles of the dry cake or fragments in the downward direction.

With regard to the process, the object is achieved by the invention with a method of claim 19.

With regard to the method, the starting point for the invention is a method in which an aqueous polymer gel is dried and the dried polymer gel is comminuted to give dried polymer particles with a comminution arrangement. For this purpose, a belt drier arrangement is provided that has:

a belt drier having a drier setup and a conveyor belt for receiving and for drying the aqueous polymer gel to give a dry cake on a receiving surface of the conveyor belt, a comminution arrangement, disposed downstream of the drier setup in product flow direction, for comminution of the dried polymer gel of the dry cake or any fragments thereof to give dried comminuted polymer particles.

According to the invention, the comminution arrangement comprises a comminutor in the form of a milling drum, and in the method:

the dried polymer gel of the dry cake is comminuted to give dried comminuted polymer particles, where the dry cake or any fragments thereof are processed by milling with an upper working line of a working edge of the milling drum at or above a receiving surface of a conveyor belt and the milling drum ejects the comminuted dried polymer particles of the dry cake or fragments in the downward direction.

A working line of a working edge of the milling drum is understood to mean the tangent to the upper vertex of the working edge of the milling drum. Correspondingly, a lower working line of the milling drum is understood to mean a tangent to the lower vertex of the working edge of the milling drum. The working edge is understood to mean that outer edge of the milling drum that works on the dry cake; in other words, more particularly, the circular edge that delineates the functional elements and the radius of which is defined by the outer end of functional elements of the milling drum.

According to the concept of the invention, in simplified terms, a milling drum is disposed at the level of or above the level of a conveyor belt for mill processing of the dry cake and ejection of milled dried polymer particles of the dry cake in the downward direction.

The invention proceeds from the consideration that improved comminution of dried polymer particles of the dried polymer strand, especially of the dry cake or any fragments of the dry cake, on the conveyor belt is problematic or barely achievable at the end of a conveyor belt of a belt drier with just a cross-blade comminutor.

Proceeding from this consideration, the invention has recognized that the milling drum, firstly, can be better matched to a distribution of polymer particles in the dry cake and fragments of the dry cake immediately downstream of the conveyor belt and, secondly, the product of well-comminuted or finely comminuted dried polymer particles can independently be matched with regard to the requirements for the pneumatic conveying operation and/or a grinding operation.

The invention also leads to a production method according to claim 20.

According to the invention, the production method for production of water-absorbing polymer particles has the steps of:

polymerizing a monomer solution or suspension to give water-absorbing polymer particles of an aqueous polymer gel, where the solution comprises a) at least one ethylenically unsaturated monomer which bears acid groups and may have been at least partly neutralized, b) at least one crosslinker, c) at least one initiator, d) optionally one or more ethylenically unsaturated monomers copolymerizable with the monomers mentioned under a) and optionally one or more water-soluble polymers, conveying the aqueous polymer gel to a belt drier arrangement.

The invention further provides for:

drying the aqueous polymer gel and comminuting the dried polymer gel to give dried polymer particles with a belt drier arrangement according to any of claims 1 to 18, having:

a belt drier having a drier setup and a conveyor belt for receiving and for drying the aqueous polymer gel to give a dry cake or fragments on a receiving surface of the conveyor belt, a comminution arrangement, disposed downstream of the drier setup in product flow direction, for comminution of the dried polymer gel of the dry cake or fragments to give dried comminuted polymer particles, wherein the comminution arrangement has a comminutor in the form of a milling drum, and in the method:

the dried polymer gel of the dry cake is comminuted to give dried comminuted polymer particles, where the dry cake or fragments are processed by milling with an upper working line of a working edge of the milling drum at or above a receiving surface of a conveyor belt and the milling drum ejects the comminuted dried polymer particles (39) of the dry cake or fragments in the downward direction, optionally grinding and/or classifying the dried and comminuted polymer particles.

Further advantageous developments of the invention can be taken from the dependent claims and individually specify advantageous ways of implementing the concept elucidated within the scope of the objective and with regard to further advantages.

Advantageously, the drier setup has a conveyor belt for receiving the aqueous polymer gel on the conveyor belt and for conveying the polymer gel on the conveyor belt in a conveying direction through the drier setup and a polymer gel inlet and a polymer gel outlet. More particularly, the drier setup has an air conduit connected to the drier setup for conveying input air and output air for drying the aqueous polymer gel.

The comminution arrangement is advantageously disposed downstream, in product flow direction, of a polymer gel outlet for comminution of the dried polymer gel to dried polymer particles, the dried polymer gel being supplied to the comminution arrangement as a dry cake or fragments of the dry cake of dried polymer gel and being comminuted to dried polymer particles.

Preferably, the milling drum has a rotatable shaft with functional elements and the conveyor belt has a deflecting roll, the rotatable shaft having been designed to rotate with a direction of rotation counter to a direction of rotation of the deflecting roll. The opposing directions of rotation that are preferred in this manner assist the ejection of comminuted dried polymer particles of the dry cake or of the fragments in the downward direction.

Preferably, a radius of the milling drum is not less than the thickness of the dry cake or of the fragments and/or a lower working line of the milling drum is below a receiving surface of a conveyor belt. These provisions assist virtually complete guiding of the dry cake or fragments directly onto the milling drum, and full capture of said cake or fragments thereby. Individually or alone, these provisions particularly reduce the risk that the dry cake or fragments are guided wholly or partly past the milling drum.

Preferably, the upper working line of the milling drum is above an upper edge of the dry cake or above an upper edge of the fragments. This assists the ejection of comminuted dried polymer particles of the dry cake or of the fragments in the downward direction.

Preferably, the upper working line of the milling drum has an upper distance from the receiving surface of the conveyor belt and the upper distance above the level of the receiving surface of the conveyor belt is at least 5 cm, preferably at least 8 cm, preferably at least 10 cm. This assists the ability of the milling drum to efficiently work directly on the dry cake or fragments. It is assured that the milling drum impacts the dry cake or fragments more or less from above.

Preferably, a support for the dry cake or for the fragments is disposed between the conveyor belt and the milling drum, in an extension of the conveyor belt. This prevents portions of the dry cake and of the fragments from falling through in uncomminuted form between the milling drum and the end of the conveyor belt. Moreover, impact forces from the milling drum are absorbed by the support; this means that the conveyor belt and/or a rear deflecting roll does not have to absorb such impact forces.

Preferably, the support is designed as a support table with a closed support face, where a rear distance is left between a rear edge of the support table and a front working edge of the milling drum. A support table has particularly good support properties and, with its closed support face, efficiently prevents portions of the dry cake and of the fragments from falling through in uncomminuted form beyond the end of the conveyor belt. The distance left between a rear edge of the support table and a front working edge of the milling drum can accordingly be set in an advantageous manner.

Advantageously, the support takes the form of a support grid having laterally interspaced support elements, especially rods, bars, poles or the like. A support grid is implementable in a relatively simple manner. A support grid can additionally assist the comminuting action of the milling drum when the dry cake or fragments break up on the spaced-apart support elements of the support grid.

Particularly advantageously, a front part of the support is designed as a support table with a closed support face and a rear part of the support takes the form of a support grid having laterally interspaced support elements, especially rods, bars, poles or the like. This preferred development combines the advantages of an above-elucidated support table and an above-elucidated support grid.

Advantageously, functional elements on the milling drum can mesh into the interspaces between support elements of a support grid. This has the advantage that the functional elements on the milling drum impact the dry cake or fragments, such that they break up on the spaced-apart support elements of the support grid. The distance between the support elements laterally spaced apart by interspaces can accordingly be set in an advantageous manner.

A milling drum may, but need not, be the sole comminutor of a comminution arrangement. In one development, it may be the case that the comminution arrangement, in addition to the milling drum and an optional conveying screw, has a further comminution element and/or guide element, especially a further comminutor and/or a deflecting means.

A further comminutor in the context of the present application shall generally be understood to mean a means having at least one rotating drum (rotor); in other words, a rotating drum alone (mill, cutting mill) or a rotating drum, especially spiked drum, in combination with a stationary part (crusher, especially cross-blade comminutor), or else a rotating drum in combination with one or more rotating drums (mill). This also includes a comminutor in the form of a conveying screw that serves the primary purpose of conveying, but can also assume a comminution function. A comminutor thus comprises at least all kinds of mills, crushers and screws, but not grids or similar guiding means, since the latter do not have any rotating drum that actively serves to comminute dried polymer gel of the dry cake to dried polymer particles.

It is preferably the case that the comminution arrangement comprises a conveying screw, wherein the milling drum comminution arrangement is disposed immediately upstream of the conveying screw in product flow direction and/or the conveying screw functions as a further comminutor.

It is preferably the case that the conveying screw is disposed alongside or beneath the milling drum and/or is disposed to receive free-falling dried polymer particles from the milling drum.

Furthermore, the development makes use of the advantage that the comminution arrangement is preferably disposed immediately after the polymer discharge at the end of the conveyor belt and immediately downstream of the pneumatic conveying operation. In this way, the comminution arrangement is accommodated in a space-saving manner between the belt drier and the pneumatic conveying operation. Nevertheless, it can be operated independently of the belt drier, especially largely independently of the properties of the coarse fragments of dried polymer particles that have been crushed away from the dried dry cake.

It is preferably the case that the milling drum is designed to comminute the dry cake to give dried polymer particles having a predefined size distribution in order to be further conveyed directly by at least one conveying unit, especially a mechanical or pneumatic conveying unit, especially a conveying screw. Preferably, the comminution arrangement, especially the milling drum, is designed to comminute the dry cake to give dried polymer particles, where the comminuted dried polymer particles have a mass-average particle diameter between 0.5 mm and 10 mm, preferably between 1 mm and 9 mm, especially between 1 and 5 mm. The mass-average particle diameter after comminution is determined by EDANA Test Method No. WSP 220.2-05 "Particle Size Distribution".

Advantageously, the comminution arrangement is designed for a dwell time of polymer particles below 90 sec in the comminution arrangement. However, the dwell time of the polymer particles in the milling drum is much lower.

Preferably, the process and the belt drier with the comminution arrangement and/or grinding operation is robust to variations in temperature. The comminution arrangement is especially designed to comminute the polymer particles at a temperature between 40° C. and 140° C., especially between 60° C. and 120° C., preferably between 80° C. and 120° C. This has advantages with regard to the comminution and conveying of the polymer particles. This makes it possible to advantageously influence the comminution effect and size distribution of the comminuted polymer particles.

In the context of a preferred development, the milling drum is designed to rotate the shaft at a speed of rotation of more than 50 rpm and less than 250 rpm. This makes it possible to advantageously influence the comminution effect and size distribution of the comminuted polymer particles.

Advantageously, a number of functional elements on the milling drum takes the form of a number of rods, teeth, bars, paddle surfaces or toothed, zigzag or knurled elements or edges, especially toothed spirals or knurled screws. These functional elements have been found to be advantageous in the comminution of the dry cake or fragments thereof.

Advantageously, the milling drum has a number of functional elements arranged along a basic profile of a spiral to form a working edge. More particularly, the spiral has a screw flight with a flight angle between 20° and 70°. This leads to a preferred comminution and/or offers a homogenized load distribution for the milling drum over time, especially for the driving thereof, and/or for the aforementioned support.

Advantageously, the spiral may have a single screw flight or the spiral may have multiple uniformly directed or opposing, especially separate or intermeshing, screw flights. This offers the possibility of directing the product stream of comminuted dried polymer particles transverse to conveying direction, especially to the middle.

Advantageously, the comminution arrangement is disposed downstream of a pneumatic conveying and/or grinding operation in product flow direction.

It is advantageously the case that a grinding operation is designed for grinding of comminuted dried polymer particles from the comminution arrangement to dried, comminuted and ground polymer particles with a mass-average particle diameter of at least 200 μm, more preferably of 250 to 500 μm, very particularly of 300 to 700 μm. The mass-average particle diameter after grinding and sieving is determined on the product stream to EDANA Test Method No. WSP 220.2-05 "Particle Size Distribution" analogously to the mass-average particle diameter after comminution.

Working examples of the invention are now described hereinafter with reference to the drawing. This is not necessarily intended to represent the working examples to scale; instead, the drawing, serving for elucidation, is executed in schematic and/or slightly distorted form. With regard to additions of the teachings immediately apparent from the drawings, reference is made to the relevant prior art. It should be taken into account here that various modifications and alterations relating to the form and the detail of an embodiment can be undertaken without departing from the general idea and the concept of the invention. The features of the invention disclosed in the description, in the drawing and in the claims may be essential to the development of the invention either individually or in any combination. Moreover, the scope of the invention includes all combinations of at least two of the features disclosed in the description, the drawing and/or the claims. The general idea and the concept of the invention is not restricted to the exact form or the detail of the preferred embodiments shown and described hereinafter, or restricted to subject matter that would be limited compared to the subject matter claimed in the claims. In the case that ranges of dimensions are given, any values within the limits mentioned shall also be disclosed as limiting values and shall be usable and claimable as desired. Further advantages, features and details of the invention will be apparent from the description which follows, from the preferred working examples and from the drawing.

Figure 2:
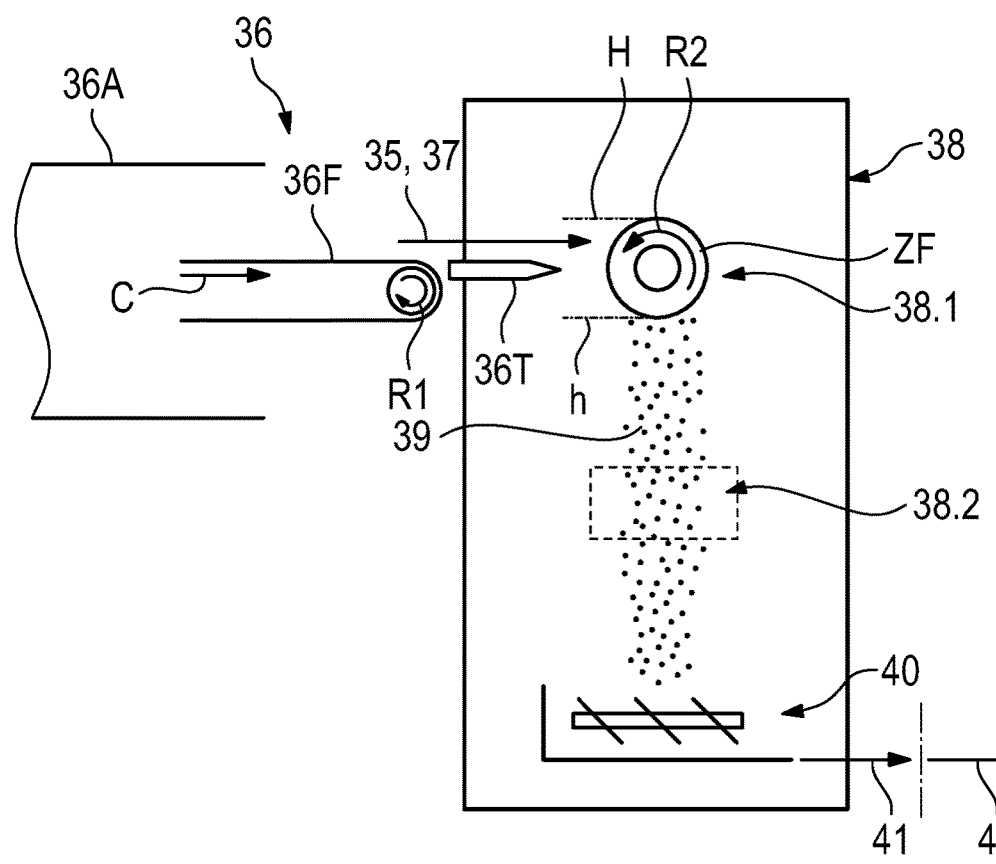
Figure 3A:
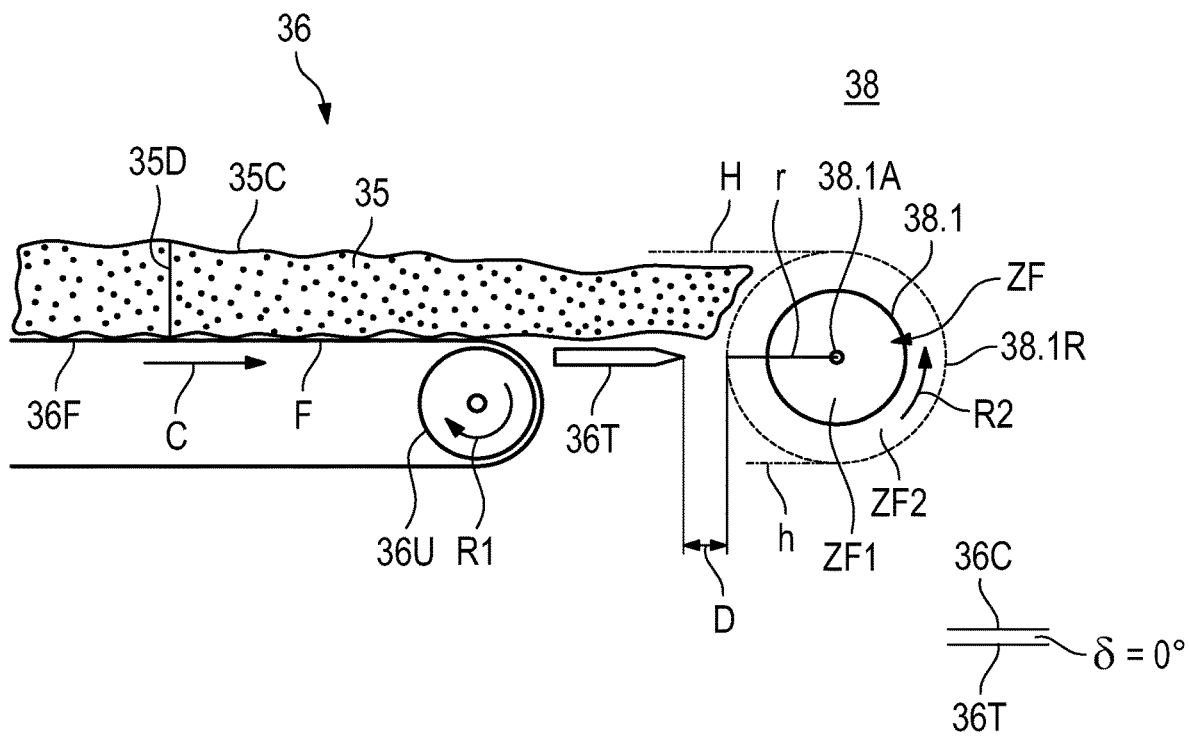
Figure 3B:
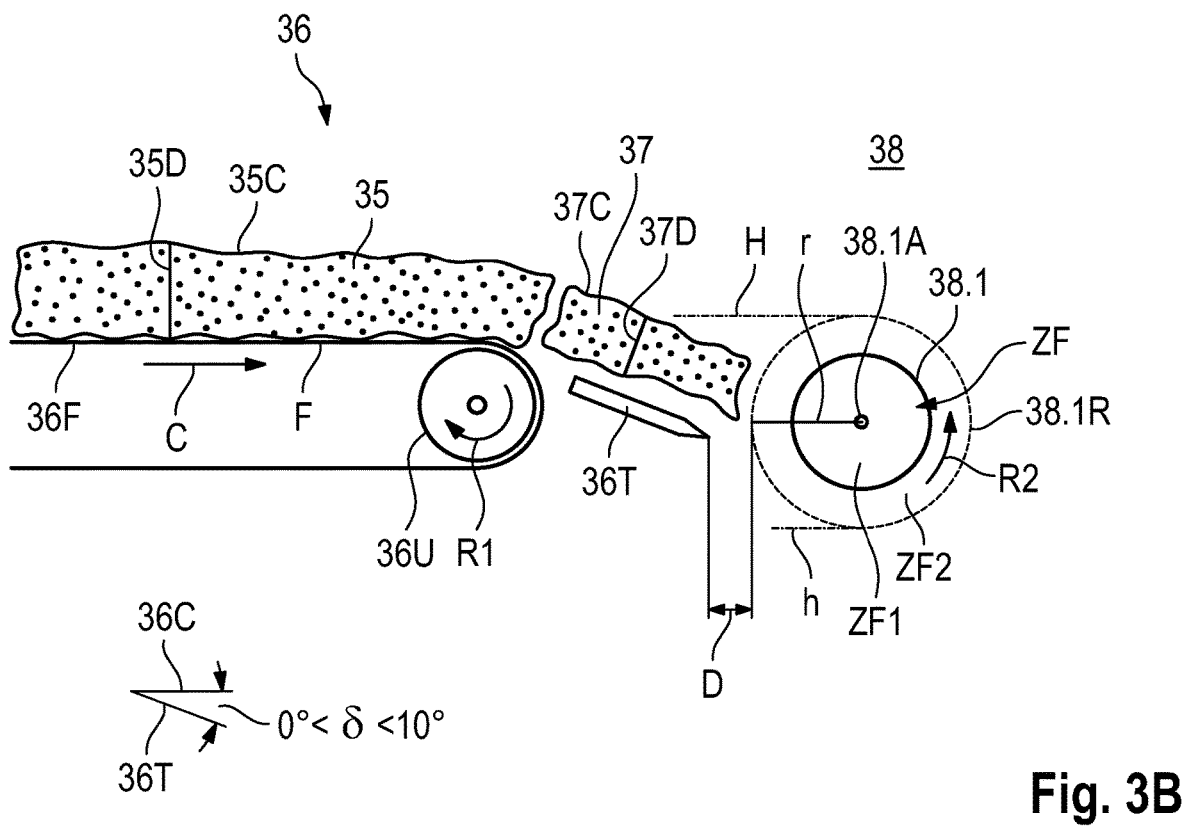
Figure 4:
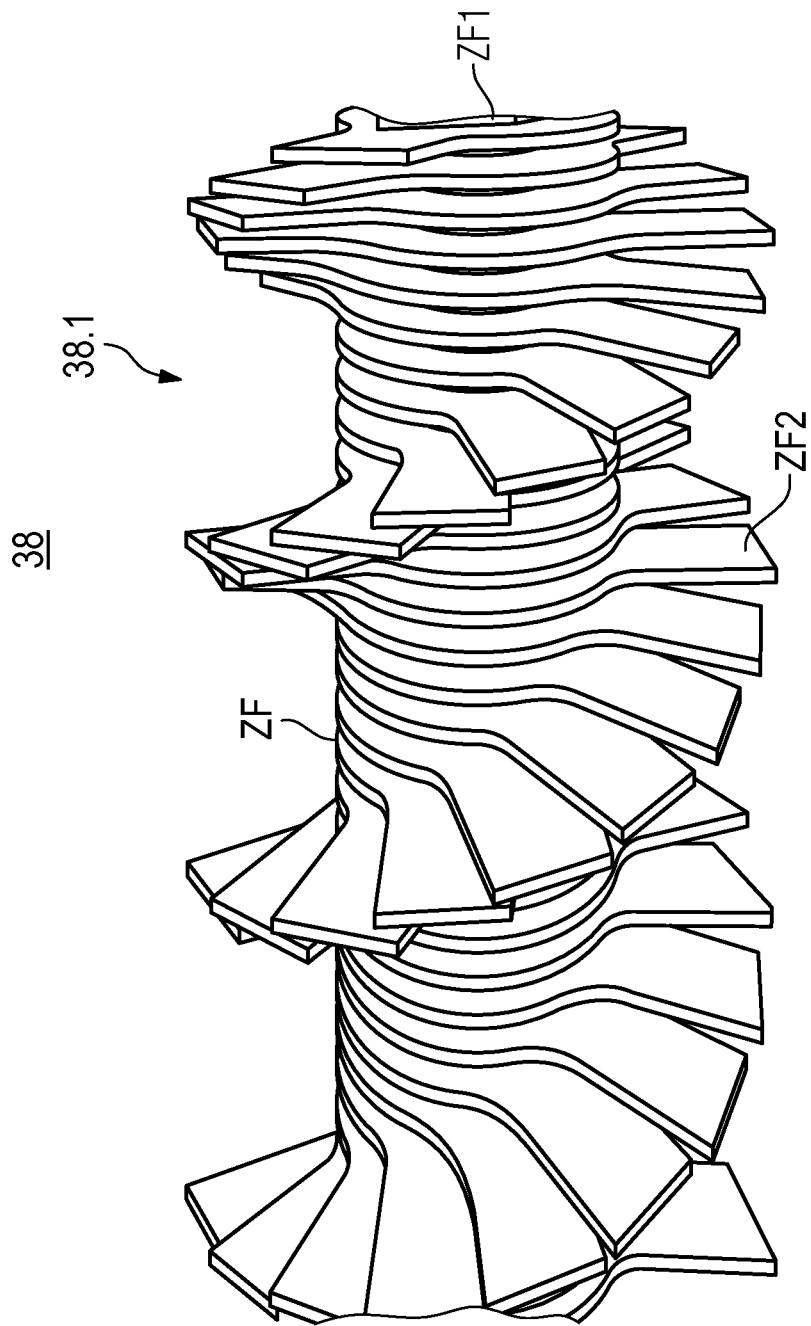
Figure 7A:
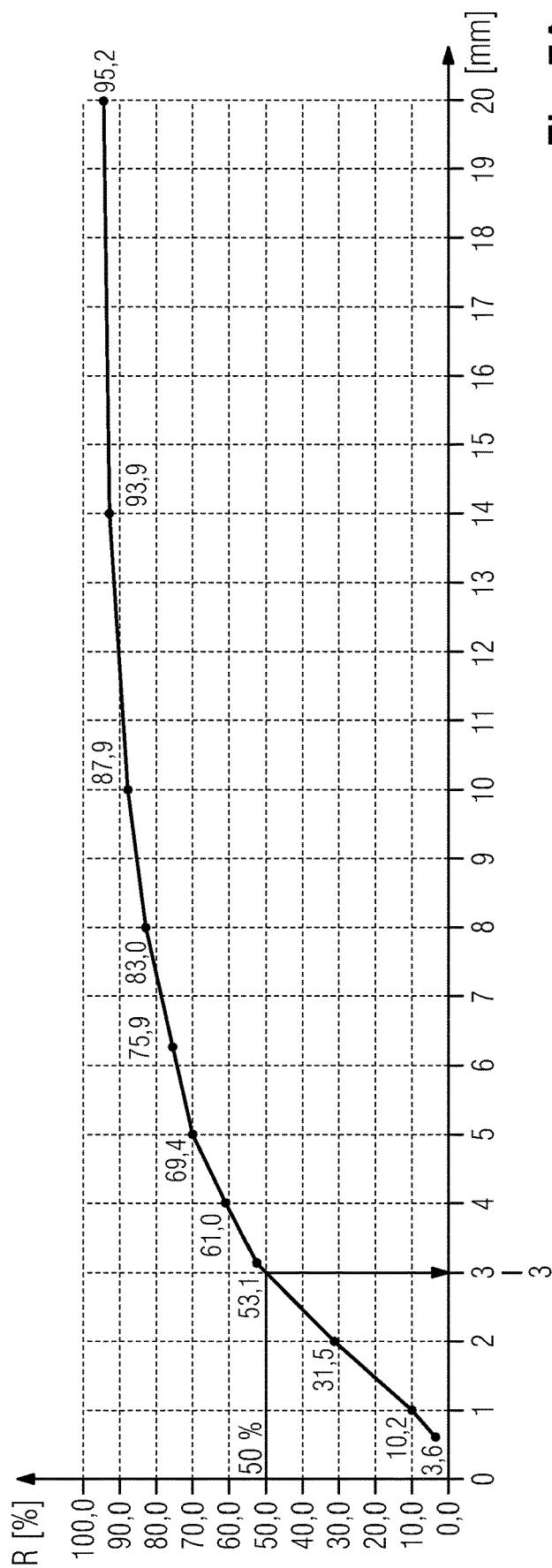

The specific drawings show:

FIG. 1 a schematic diagram of a production arrangement for production of water-absorbing polymer particles having a belt drier and, downstream of the belt drier in product flow direction, having a comminution arrangement for comminution of a dry cake of dried polymer gel to dried polymer particles, which is additionally disposed upstream of a pneumatic conveying operation in product flow direction;

FIG. 2 a preferred embodiment, shown in schematic form, of the comminution arrangement of FIG. 1 with a milling drum and a conveying screw; namely for overall comminution of a dry cake of dried polymer gel to dried polymer particles downstream of a belt drier in product flow direction and upstream of a subsequent pneumatic conveying operation;

FIG. 3A an arrangement of a rotatable shaft of a milling drum with a number of functional elements relative to a dry cake, wherein the dry cake as a whole and essentially in unbroken form is supported by a horizontal support and wherein the milling drum is designed to mill dried polymer particles directly away from the dry cake;

FIG. 3B a modified arrangement of a rotatable shaft of a milling drum with a number of functional elements relative to a dry cake, wherein the dry cake as a whole and essentially in unbroken form or partly broken-up or broken-off fragments are supported by an angled support such that the milling drum is designed to mill dried polymer particles directly away from the dry cake or directly away from fragments of the dry cake that are shown here by way of example;

FIG. 4 a detail of a rotatable shaft of a milling drum with the number of functional elements, here in the form of impact bars, designed to mill dried polymer particles away from the dry cake or fragments thereof, FIG. 5A a support in the form of a closed flat support table in an extension of the conveyor belt, in which a distance has been left between its edge and a working edge of the milling drum;

FIG. 5B a support in the form of a support grid which is at least partly open, essentially on the side facing the milling drum, with rods or bars spaced apart by interspaces or similar fixed supporting elements; functional elements of the milling drum mesh into these interspaces, and the support grid is thus in an overlapping arrangement with the working edge of the milling drum;

FIG. 6 in views A, B and C, three different basic profiles, in spiral form, of working edges of a milling drum;

FIG. 7A, FIG. 7B a cumulative plot of proportions by mass of the sieve fractions for graph determination of the mass-average particle diameter after comminution (FIG. 7A) and grinding (FIG. 7B), especially for elucidation of an analogous method of determining the mass-average particle diameter after grinding using three examples.

In the drawings, for the sake of simplicity, identical reference numerals have been utilized for identical or similar parts or parts of identical or similar function.

A production method has, for example, the following steps:

processing a monomer solution or suspension with polymerization to give an aqueous polymer gel, drying the aqueous polymer gel in a belt drier, wherein the belt drier has a circulating transport belt and the aqueous polymer gel is conveyed on the transport belt.

It is preferable here that the transport belt takes the form of a plate transport belt having a number of belt plates separated on an articulated line of an articulated construction, and wherein each belt plate has a surface for receiving the aqueous polymer gel.

More particularly, this production method may comprise: processing a monomer solution or suspension with polymerization to give a crosslinked aqueous polymer gel.

In the context of a particularly preferred development, it has been recognized that the concept of the invention or one of the developments thereof is particularly advantageous for a specific production method for superabsorbents, especially for a specific production method for a polymer gel for superabsorbents, which is described hereinafter with a few developments and is partly also elucidated in detail WO2011/104152 and WO2006/100300 A1, the disclosure content of which is hereby incorporated by reference into the disclosure content of the present application.

More particularly, this relates to a production method for production of water-absorbing polymer particles by polymerization of a monomer solution or suspension comprising a) at least one ethylenically unsaturated monomer which bears acid groups and may have been at least partly neutralized, b) at least one crosslinker, c) at least one initiator, d) optionally one or more ethylenically unsaturated monomers copolymerizable with the monomers mentioned under a) and optionally one or more water-soluble polymers.

The water-absorbing polymer particles are produced by polymerization of a monomer solution or suspension and are water-insoluble.

The aqueous polymer gel is then dried with a belt drier until a desired, preferably low, water content is established, especially in that a residual moisture content preferably is 0.5% to 15% by weight, more preferably 1% to 10% by weight and most preferably 2% to 8% by weight, the residual moisture content being determined by EDANA recommended Test Method No. WSP 230.2-05 "Mass Loss Upon Heating". In the case of too high a residual moisture content, the dried polymer gel has too low a glass transition temperature $T_g$ and can be processed further only with difficulty. In the case of too low a residual moisture content, the dried polymer gel is too brittle and, in the subsequent comminution steps, undesirably large amounts of polymer particles with an excessively low particle size are obtained ("fines"). The solids content of the gel before the drying is preferably from 25 to 90% by weight, more preferably from 35 to 70% by weight and most preferably from 40 to 60% by weight. However, a fluidized bed drier or a paddle drier may optionally also be used for drying purposes.

Thereafter, the dried polymer gel is ground and classified, and the apparatus used for grinding may be single- or multistage roll mills, preferably two- or three-stage roll mills, pin mills, hammer mills or vibratory mills.

FIG. 1 shows a schematic diagram of a production method for poly(meth)acrylates; i.e. SAPs in general. The schematic diagram in FIG. 1 shows the sequence of a production method for poly(meth)acrylates up to dried polymer particles.

The reactants 31 for preparation of the poly(meth)acrylates are introduced, for example, into a mixing kneader, belt reactor or other reactor 30. The mixing kneader comprises, for example, two axially parallel, rotating shafts, on the surfaces of which are accommodated disk faces with kneading bars disposed on their circumference. In a polymerization reaction, poly(meth)acrylate is produced as product, which leaves the reactor 30 in the form of lumps 33 of gel-like consistency. The lumps 33 go into a gel bunker 32, from which the lumps are applied with a pivot belt or similar conveying means 34 to a conveyor belt 36F, shown in FIG. 2, of a belt drier 36; in other words, the lumps 33 as superabsorbent polymer in the state of an aqueous polymer gel of still-aqueous polymer gel particles. The belt drier 36 removes liquid from the aqueous polymer gel particles on the conveyor belt 36F at a temperature of up to 200° C., such that they are conveyed through the belt drier on the conveyor belt in the form of partly dried, i.e. still-moist, polymer gel particles. The dried poly(meth)acrylate lumps, in the form of dried polymer gel particles of a boardlike firm dry cake 35, arrive at the outlet of the belt drier. The dry cake 35 then goes into a comminution arrangement 38.

At the end of the conveyor belt, the dry cake 35 can go into the comminution arrangement 38 in unbroken form (as can be seen in FIG. 3A) or may be in the form of crushed or partly crushed fragments 37 (as can be seen in FIG. 3B); then the fragments 37, i.e. coarse fragments or lumps, subsequently go into the comminution arrangement 38.

If the dry cake 35, in a first modified embodiment (FIG. 3A), arrives directly at a mill of a comminution arrangement 38 in unbroken form, i.e. as a whole, comminuted polymer particles are milled directly away from the dry cake 35. However, it is also possible in principle, in a second modified embodiment (FIG. 3B), for fragments 37 of the dry cake 35 or other coarse lumps to be milled by the mill to give comminuted polymer particles.

As part of a comminution arrangement according to the prior art, for example according to WO2013/072419, just one comminutor designed as a cross-blade comminutor is provided. A cross-blade comminutor according to the prior art comprises, for example, a shaft on which a multitude of functional rods are accommodated. The functional rods are welded to the shaft 10. As well as the functional rods disposed on the shaft, a cross-blade comminutor comprises a multitude of fixedly mounted bars that mesh into interspaces between the functional rods 14 disposed on the shaft. The poly(meth)acrylate lumps of dried polymer particles of the dry cake that have been introduced into the comminutor typically fall from the conveyor belt onto the fixedly mounted bars and come to rest thereon. The functional rods that rotate with the shaft crush the lumps. After passing through the cross-blade comminutor, the coarsely comminuted dried polymer particles are supplied via a pneumatic transport system, for example a grinding operation or the like, with a mill. The poly(meth)acrylate particles are comminuted further therein until the product takes the form of a powder.

However, a problem with this comparatively simple and efficient prior art plant design with just one cross-blade comminutor is that there can be a lack of sufficiently fine comminution of fragments by means of the only one cross-blade comminutor. This is because, depending on the product to be dried (solids content of monomer solution, neutralization level, crosslinking level, etc.), the drying conditions and the throughput of the belt drier, the dry cake 35 can indeed quite possibly be expected to have different hardness. Thus, according to the dimensions, a cross-blade comminutor provided on its own may possibly be insufficient to provide finely comminuted fragments. These could, for example, fall through a spacing region of excessively large dimensions between the bars of the cross-blade comminutor, or they could simply come to rest thereon. Both cases are found to be disadvantageous for the operation of the plant. Especially if excessively coarse lumps get into the pneumatic transport system, this could lead to transport problems. More particularly, excessively coarse lumps could be processed only disadvantageously by the mill provided further on in the conveying region, or not even introduced into it.

In the present case, the invention has recognized the utility of a milling drum 38.1 shown as a preferred embodiment in FIG. 2 ff. in multiple aspects. The milling drum 38.1 works directly on the dry cake 35 (FIG. 3A) in a first modification or directly on the fragments 37 of the dry cake 35 in a second modification (FIG. 3B)—in other words, the milling drum 38.1 directly mills an unbroken dried polymer strand that has been accepted more or less horizontally from the conveyor belt 36F of the belt drier 36, i.e. a dry cake 35, or a crushed polymer strand, i.e. fragments 37 of the dry cake 35.

Therefore, for the comminution arrangement 38 of FIG. 1, a comminutor designed as a milling drum 38.1 is provided; in other words, the milling drum 38.1 mills the dry cake 35 or the fragments 37 of the dry cake that are pushed by the conveyor belt 36F of the belt drier 36 directly and more or less horizontally against the milling drum to give comminuted dried polymer particles 39.

Optionally, the milling drum 38.1 is combined in combination with a further comminution element and/or guide element 38.2 of the comminution apparatus 38, arranged downstream of the milling drum 38.1. The further comminution element and/or guide element 38.2 of the comminution apparatus 38 may be a further comminutor. The further comminution element and/or guide element 38.2 of the comminution apparatus 38 may also be a deflecting means, such as a funnel or the like.

According to the concept of the invention, in simplified terms, the milling drum 38.1 is disposed at the level of or above the level of a receiving surface of a conveyor belt for mill processing of the dry cake and ejection of milled dried polymer particles of the dry cake in the downward direction.

It is specifically the case that—as apparent in FIG. 2 ff.—an upper working line H of a working edge 38.1R of the milling drum 38.1 is disposed at or above a receiving surface F of a conveyor belt 36F, for mill processing of the dry cake 35 or of the fragments 37 thereof, where the milling drum 38.1 is designed to eject comminuted dried polymer particles 39 of the dry cake 35 in the downward direction.

The ejection of comminuted dried polymer particles 39 of the dry cake 35 in the downward direction follows gravity and is preferably assisted by the direction of rotation of the milling drum 38.1. A working line H of the working edge 38.1R of the milling drum 38.1 is understood to mean the tangent to the upper vertex at the working edge 38.1 R of the milling drum 38.1. Correspondingly, a lower working line h of the milling drum is understood to mean a tangent to the lower vertex of the working edge 38.1R of the milling drum 38.1. The working edge 38.1 R shall be understood to mean the circle of radius defined by the end of the functional elements ZF2 of the milling drum; in other words, in particular, that outer edge of the milling drum 38.1 that works on the dry cake 35 or fragments 37 thereof.

This ensures that the comminuted polymer particles from the milling drum are sufficiently finely comminuted to be conveyable by the pneumatic transport system and preferably to be efficiently grindable by a mill. The details of a comminution arrangement 38 of FIG. 1 are elucidated in relation to the further figures, FIG. 2 to FIG. 6.

Still with reference to FIG. 1, the comminution arrangement 38 to the milling drum 38.1 and the optional further comminution element and/or guide element 38.2 optionally also has a conveying screw 40 which is shown and further elucidated in FIG. 2. If no optional further comminution element and/or guide element 38.2 is provided, the milling drum 38.1 of the comminution arrangement 38 is disposed directly upstream of the conveying screw 40 in product flow direction. The conveying screw 40 in FIG. 1, in product flow direction, is disposed immediately downstream of the milling drum 38.1 or an optional further comminution element and/or guide element 38.2. If an optional further comminution element and/or guide element 38.2 is provided, the milling drum 38.1 of the comminution arrangement 38 is thus disposed directly upstream of the further comminution element and/or guide element 38.2 and indirectly upstream of the conveying screw 40 in product flow direction.

In the present context, dried polymer particles (more specifically poly(meth)acrylate particles), i.e. polymer particles comminuted sufficiently for pneumatic conveying and for a grinding operation, collectively given the reference numeral 39 here, are supplied to the conveying screw 40. The conveying screw 40 preferably provides for homogenization of the main flow of a good product.

The dried polymer particles of the main flow 41 that have been well-comminuted and homogenized in this respect are then supplied to a pneumatic conveying operation 42, and these sufficiently comminuted polymer particles in the homogenized product stream for the pneumatic conveying are identified by reference numeral 43. These dried polymer particles 43 are then supplied to a grinding 44 with a mill for a grinding operation, where they are ground, and arrive as ground dried polymer particles 45 in a sieving apparatus 46. Downstream of the sieving apparatus 46, the sieved, ground and dried polymer particles 47 with a desired particle size distribution of the good fraction leave the sieving apparatus, and these sieved, ground, dried polymer particles 47 are optionally sent to a further treatment, for instance a surface postcrosslinking operation and a subsequent drying operation or other thermal treatment operation, and, after a safeguard screening, provided as product. Any fractions with oversize downstream of the sieving apparatus 46 can be sent once again to a grinding operation 44 in the mill until they have a desired particle size distribution of the good fraction.

The average particle size of the superabsorbent polymer particles removed as ground polymer particles is preferably at least 200 µm, more preferably from 250 to 600 µm and very particularly from 300 to 500 µm. The average particle size of the polymer particles may be determined by means of EDANA recommended Test Method No. WSP 220.2-05 "Particle Size Distribution", where the proportions by mass of the screen fractions are plotted in cumulated form and the average particle size is determined graphically. The average particle size here is the value of the mesh size which arises for a cumulative 50% by weight.

The proportion of polymer particles having a particle size of greater than 150 µm is preferably at least 90% by weight, more preferably at least 95% by weight, most preferably at least 98% by weight.

Polymer particles having too small a particle size lower the permeability (corresponding to an SFC value as a measure of the permeability of liquid between polymer particles; test method, for example, EP 0 752 892 B1 pp. 33-36 [0224]-[0251]). The proportion of excessively small polymer particles ("fines") should therefore be small.

Excessively small polymer particles are therefore removed and recycled into the production method. The recycling is preferably done before, during or immediately after the polymerization, i.e. before the drying of the polymer gel. The excessively small polymer particles can be moistened with water and/or aqueous surfactant before or during the recycling.

It is also possible to remove excessively small polymer particles in later production method steps, for example after the surface postcrosslinking or another coating step. In this case, the excessively small polymer particles recycled are surface postcrosslinked or coated in another way, for example with fumed silica.

If a kneading reactor is used for polymerization, the excessively small polymer particles are preferably added in the last third of the kneading reactor.

If the excessively small polymer particles are added at a very early stage, for example actually to the monomer solution, this lowers the centrifuge retention capacity (CRC) of the resulting water-absorbing polymer particles. However, this can be compensated for, for example, by adjusting the amount of crosslinker b) used. The excessively small polymer particles can also be added at a later stage, but could then possibly be incorporated only inadequately.

Inadequately incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 µm is preferably at least 90% by weight, more preferably at least 95% by weight, most preferably at least 98% by weight. The proportion of particles having a particle size of at most 600 µm is preferably at least 90% by weight, more preferably at least 95% by weight, most preferably at least 98% by weight. Polymer particles with too great a particle size lower the swell rate. The proportion of excessively large polymer particles should therefore likewise be low. Excessively large polymer particles are therefore removed and recycled into the grinding of the dried polymer gel.

According to the concept of the invention, there follows a description with regard to the above-described FIG. 1, with reference to FIG. 2 ff., of preferred comminution arrangements 38 which comminute the dried polymer strand of polymer gel, i.e. the dry cake 35 or fragments 37 of the dry cake 35, after the drying or downstream of a belt drier 36, in an improved manner to give dried polymer particles 39—in each case with a mass-average particle diameter well above 0.5 mm. More particularly, the dried polymer particles, in the context of the improved comminution process for the dried polymer gel of the dry cake 35 or fragments 37 of the dry cake 35, are to be comminuted with a particle size suitable or intended for a subsequent pneumatic conveying and/or grinding operation.

In this regard, FIG. 2 shows a comminution arrangement 38 with a first comminutor in the form of a milling drum 38.1, also referred to as comminuting mill ZF. The comminution arrangement 38 also has a conveying screw 40. For the sake of simplicity, the conveying screw 40 is shown rotated by 90° in FIG. 2. However, it is actually aligned with its axis parallel to the axis of the milling drum 38.1 (i.e. in reality rotated by 90° compared to FIG. 2). Thus, the conveying screw 40 is designed to transport the polymer particles 39 in the lateral direction, i.e. along the axis, and/or (according to the design of the spiral of the conveying screw 40) to draw them together; i.e. preferentially to transport them toward the middle of this axis. The conveying screw 40 here advantageously also serves to homogenize the already comminuted and dried polymer particles 39. In addition, this may advantageously be designed for further comminution of the dried polymer particles 39. In this respect, the conveying screw 40 may also serve as a further comminutor of already comminuted polymer particles and for production of a homogenized stream 41 thereof. These comminuted and sufficiently homogenized dried polymer particles 41 then arrive as product stream 43 in the pneumatic conveying operation 42.

What is advantageous in this arrangement is that the milling drum 38.1 to comminute the dry cake 35—i.e. the unbroken dry cake 35 that arrives directly, virtually horizontally, at the milling drum 38.1 (FIG. 3A) or the fragments 37 of the dry cake 35 that arrive more or less horizontally and directly at the milling drum 38.1 (FIG. 3B)—to give dried polymer particles 39 that have a predefined size distribution in order to be able to be conveyed directly by the pneumatic conveying operation 42.

In this respect, the conveying screw 40 shown in FIG. 2 is optional. It may also be provided exclusively for transport and homogenization of the polymer particles 39. However, it may advantageously also function as second comminutor for the polymer particles 39. The polymer particles 41 and also the homogenized polymer particles in the present context have a mass-average particle diameter between 0.5 mm and 10 mm, preferably between 1 mm and 9 mm, especially between 1 and 5 mm.

The overall comminution arrangement 38 preferably works at a temperature above about 40° C. up to a maximum of 140° C., preferably 60-120° C., more preferably 80-120° C.—this ensures, in an exceptional manner, comparatively constant hardness levels of the dry cake 35 in the region of the comminution arrangement 38 and prevents condensation of moisture and caking.

The relative arrangement of the milling drum 38.1 in relation to the dry cake 35 in the drier setup 36 (FIG. 3A) or the fragments 37 thereof (FIG. 3B) will now be shown in detail in FIG. 3A and FIG. 3B respectively, wherein, for this purpose, the conveyor belt 36F of the setup 36 is shown with the dry cake 35. For example, a milling drum 38.1 is shown in FIG. 4.

The dry cake 35 can be processed by the milling drum by guiding it in unbroken form over a support, shown here as a support table 36T in one variant, according to FIG. 3A.

However, it is also possible to crush the dry cake 35 at the end of the conveyor belt 36F according to FIG. 3B. Then the fragments 37 of dried polymer particles of the dry cake 35 will slide or be pushed across a support, shown here as a support table 36T in one variant, in the direction of the milling drum 38.1 which is provided here as a crucial comminutor. It has been found that it is advantageous to position the milling drum 38.1 for milling of dried polymer particles directly at the dry cake, or to guide the dry cake or any fragments 37 thereof directly to the milling drum 38.1.

For this purpose, the milling drum 38.1 in the form of a comminuting mill ZF has a rotatable shaft ZF1 having a number of functional elements ZF2 designed to mill dried polymer particles directly off the dry cake 35 or the fragments or lumps 37 thereof. The working edge 38.1 R of the milling drum 38.1 is understood to mean that outer edge of the milling drum that works on the dry cake; in other words, more particularly, the circumference having a radius defined by the end of functional elements of the milling drum.

Still with reference to FIG. 3A and FIG. 3B, in the embodiment shown here, it is envisaged that the milling drum 38.1 is arranged at a distance D of 0.5 to 5 cm from the end of the support.

A support for the dry cake 35 or the fragments 37 thereof is disposed between the conveyor belt 36F and the milling drum 38.1 in an extension of the receiving surface F and aligned virtually parallel to the conveyor belt 36F or to transport direction C, or else inclined at an angle δ to the horizontal or to transport direction C, i.e. preferably downward, but alternatively upward as well if appropriate.

In the embodiment of FIG. 3A, the angle δ is close to or in the region of 0°, meaning that the support in the form of a support table 36T is aligned virtually parallel to the conveyor belt 36F or to transport direction C.

In the embodiment of FIG. 3B, the angle δ to the horizontal or to transport direction C in the downward direction is somewhat greater than 0°, meaning that the support table 36T is slightly inclined, namely in the present context with an angle δ of 1° to 5° in the downward direction. Optionally, in a modified embodiment, the angle δ may, however, be up to 10° or if appropriate up to 15°.

In a varied embodiment which is not shown here, an angle δ' to the horizontal or to transport direction C may alternatively also be directed upward. For example, the support table 36T may be virtually parallel to the conveyor belt 36F or alternatively inclined slightly upward, such that the dry cake 35 or fragments 37 of the dry cake, owing to the upward incline of the support table 36T, are deposited on a slightly upward slope. Such an angle δ' upward relative to the horizontal or to transport direction C may, for example, be an angle δ' of 1° to 5° or if appropriate up to 10° or if appropriate up to 15°. In principle, angles δ, δ' downward or upward at least up to 30° are theoretically conceivable.

The relative height of the milling drum 38.1 is set in relation to the conveyor belt 36F in order to achieve very substantially homogeneous and sufficient comminution of the dry cake 35 or the fragments 37 to dried polymer particles. In other words, the upper working line H of the milling drum 38.1, for mill processing of the dry cake 35 or of the fragments 37, is at least level with or slightly above the receiving surface of the conveyor belt 36F, as apparent in FIG. 3A and FIG. 3B. Thus, the milling drum is already arranged in the downward direction for ejection of milled dried polymer particles 39 of the dry cake. In addition, the milling drum 38.1 has a rotatable shaft ZF1 with functional elements ZF2 and the conveyor belt 36F has a deflecting roll 36U, the rotatable shaft ZF1 having been designed to rotate with a direction of rotation R2 counter to a direction of rotation R1 of the deflecting roll 36U. This too assists the ejection of milled dried polymer particles 39 of the dry cake in the downward direction.

The relative alignment of milling drum 38.1 to the dry cake 35 and fragments 37, in the manner described above, is indicated by the working line H. In the present context, the working line H of the working edge 38.1R of the milling drum 38.1 is at the level of or above the receiving surface F of the conveyor belt 36F. This is apparent from the leveling of the working line H relative to the receiving surface F of the conveyor belt 36F. According to FIGS. 3A and 3B, in the case of an unbroken dry cake 35, more preferably, the upper working line H of the milling drum 38.1 is above an upper edge 35C of the dry cake or relative to the upper edge 35C of the dry cake 35 or the upper edge 37C of the fragments 37.

On the other hand, following the concept of the invention, it is ensured in the present context that the milling drum 38.1 has a sufficiently large diameter. For this purpose, it is ensured that the axis 38.1A of the milling drum 38.1 is at the level of or below the level of the receiving surface F of the conveyor belt 36F. Specifically, it is ensured in the present context that a radius r of the milling drum 38.1 is not less than the thickness 35D, 37D of the dry cake 35 or of the fragments 37 and a lower working line of the milling drum 38.1 is below a receiving surface F of a conveyor belt 36F.

In the context of this relative alignment of the milling drum 38.1 to the dry cake 35 or fragments 37 and given the chosen parameters of the aforementioned circumferential speed and temperature conditions in the comminutor 38, the result is already a surprisingly homogeneous and well-comminuted ejection of comminuted polymer particles 39. This is addressed further in relation to FIG. 7A and FIG. 7B.

FIG. 4 shows a particularly preferred embodiment of such a milling drum 38.1 in the form of a comminuting mill ZF with said functional elements ZF2 in the form of impact bars that form a working edge 38.1R for milling of the fragments 37 or dry cake 35. The working edge 38.1R is recognizably designed to follow the profile of a spiral; here a spiral with a screwlike profile, where the screw has a flight angle—between 40° and 50°.

In order to achieve the predetermined particle size, the milling drum rotates at a speed of more than 50 revolutions per minute and less than 250 revolutions per minute, preferably in the region of 100 revolutions per minute, depending on the actual diameter of the working edge 38.1 R of the milling drum. In principle, it has been found to be advantageous that the milling drum rotates to achieve the predetermined particle size at a speed that tends to increase with decreasing diameter of the working edge 38.1R of the milling drum. In the present context, this is preferably true at an ambient temperature of 40°-140° C. Celsius, preferably 60-120° C., more preferably 80-120° C., in the region of the comminution arrangement 38.

FIGS. 5A and 5B respectively show, in a side view "1" and in a top view "2", the relative arrangement of a support elucidated by way of example in relation to FIG. 3A and FIG. 3B; namely in one case a support table 36T and in the other case a support grid 36G for supportive guiding of the dry cake 35 or—in the event that it should break up—the fragments 37 of the dry cake 35 directly to the milling drum 38.1. In this regard, FIG. 5A and FIG. 5B each show the milling drum 38.1 with appropriate functional elements ZF2 on a shaft ZF1 and with the working edge 38.1 R formed thereby.

In the embodiment of FIG. 5A, the support is designed as a support table 36T with a closed support face, where a distance D is left between an edge of the support table 36T and a working edge 38.1R of the milling drum 38.1. The distance D may quite possibly be in the range between 0.5 cm and 20 cm, preferably below 10 cm, more preferably below 2 cm.

In the embodiment of FIG. 5B, there is no such distance between the support and the milling drum 38.1. In this case, the support is at least partly in the form of a support grid 36G with rods or bars or similar support elements 36B which are laterally spaced apart by interspaces and mesh into the interspaces of functional elements ZF2 on the milling drum 38.1.

In both embodiments, either the distance D is kept to a minimum (FIG. 5A) or else is avoided (FIG. 5B), so as to prevent any relatively small pieces of the dry cake 35 or fragments 37 from bypassing between support (for example a support table 36T or a support grid 36G) and milling drum 38.1. The support, whether in the form of a support table 36T or support grid 36G, also has the advantage that the impact pressure of the functional elements ZF2 on the milling drum 38.1 is absorbed by the support.

FIG. 6 shows, in schematic form, options for a basic profile of a working edge 38.1 R (in the sense of an enveloping boundary line for the working edge); for example, in view A, for a shaft ZF1 of the milling drum 38.1 shown by way of example in FIG. 4 or FIG. 5A, FIG. 5B.

In view A, the working edge 38.1 R follows a spiral-like basic profile, which turns in the clockwise sense viewed from left to right.

View B in FIG. 6 shows a similar spiral-like profile of the working edge 38.1 R, where the spiral in this case turns from left to right in the counterclockwise sense. According to the direction of rotation of the milling drum 38.1R, this is also accompanied by corresponding conveying of a product stream of milled polymer particles to the side. View C of FIG. 6 shows a further embodiment in which, according to the direction of rotation of the milling drum 38.1R, a product stream of milled polymer particles is conveyed toward the middle since the spiral-like profiles for a working edge 38.1 R on a left-hand side and on a right-hand side are executed in an opposing manner from the middle M of the milling drum 38.1R. Further embodiments are conceivable, such as intermeshing, parallel, spiral working lines etc.

FIG. 7A shows a cumulative plot of proportions by mass of the sieve fractions for graph determination of the mass-average particle diameter after comminution.

The result of the measurement is plotted in the table below, tab. 1, with the sieve sizes; the values are shown in FIG. 7A. The mass-average particle diameter in the product stream 41 after comminution is about 3.0 mm, which is apparent from the plot and assignment of a mass-average particle diameter of particles for a 50% by weight value in FIG. 7A. The mass-average particle diameter after comminution is determined by EDANA Test Method No. WSP 220.2-05 "Particle Size Distribution". For the determination of particle size distribution in the product stream 41 after comminution, however, sieves having mesh sizes of 0.6/1/2/3.15/4/5/6.3/8/10/14/20 mm are used (see Fraction below). The mass-average particle diameter here is the "Mesh size" value that arises for the cumulative 50% by weight shown in FIG. 7A.

TABLE 1

| Fraction size | SAP total wt.(%) | Fraction (mm) | SAP cum. wt.(%) |
|---|---|---|---|
| 0-600 µm | 3.62 | 0.6 | 3.6 |
| 600 µm-1 mm | 6.55 | 1 | 10.2 |
| 1 mm-2 mm | 21.38 | 2 | 31.6 |
| 2 mm-3.15 mm | 21.52 | 3.15 | 53.1 |
| 3.15 mm-4 mm | 7.91 | 4 | 61.0 |
| 4 mm-5 mm | 8.40 | 5 | 69.4 |
| 5 mm-6.3 mm | 6.49 | 6.3 | 75.9 |
| 6.3 mm-8 mm | 7.10 | 8 | 83.0 |
| 8 mm-10 mm | 4.95 | 10 | 87.9 |
| 10 mm-14 mm | 5.39 | 14 | 93.3 |
| 14 mm-20 mm | 1.92 | 20 | 95.2 |
| >20 mm | 4.75 | | 100.0 |

The mass-average particle diameter after grinding and sieving is determined on the product stream 47 analogously to the mass-average particle diameter after comminution and is shown in FIG. 7B. For the determination of particle size distribution of a distribution, however, sieves having mesh sizes of 45/150/212/300/425/500/600/710/850 µm are used (see Fraction below). A determination of particle size distribution after grinding and sieving of the product stream 47 was conducted on products that were sieved off between 150 and 850 µm, between 100 and 700 µm and between 100 and 600 µm.

The respective result of the measurement is plotted in the tables below with the sieve sizes; the values are shown in FIG. 7B. The result is a mass-average particle diameter after grinding and sieving of 570 µm in the case of product sieving at 150 and 850 µm (tab. 2A), of 425 µm in the case of product sieving at 100 and 700 µm (tab. 2B), and of 348 µm in the case of product sieving at 100 and 600 µm (tab. 2C).

TABLE 2A

Product sieving 150 and 850 µm:

| Fraction size | SAP (%) coarse | Fraction | coarse cum. % by wt. |
|---|---|---|---|
| 0-45 µm | 0.1 | 45 µm | 0.1 |
| 45 µm-150 µm | 1.6 | 150 µm | 1.7 |
| 150 µm-212 µm | 4.0 | 212 µm | 5.7 |
| 212 µm-300 µm | 7.6 | 300 µm | 13.3 |
| 300 µm-425 µm | 14.1 | 425 µm | 27.4 |
| 425 µm-500 µm | 11.0 | 500 µm | 38.4 |
| 500 µm-600 µm | 16.9 | 600 µm | 55.3 |
| 600 µm-710 µm | 26.9 | 710 µm | 82.2 |
| 710 µm-850 µm | 17.7 | 850 µm | 99.9 |
| >850 µm | 0.1 | | 100.0 |

TABLE 2B

Product sieving 100 and 700 µm:

| Fraction size | SAP (%) | Fraction | mid. cum. % by wt. |
|---|---|---|---|
| 0-45 µm | 0.0 | 45 µm | 0.0 |
| 45 µm-150 µm | 5.5 | 150 µm | 5.5 |
| 150 µm-212 µm | 7.2 | 212 µm | 12.7 |
| 212 µm-300 µm | 12.6 | 300 µm | 25.3 |
| 300 µm-425 µm | 25.1 | 425 µm | 50.4 |
| 425 µm-500 µm | 18.8 | 500 µm | 69.2 |
| 500 µm-600 µm | 20.0 | 600 µm | 89.2 |
| 600 µm-710 µm | 9.6 | 710 µm | 98.8 |

TABLE 2B-continued

Product sieving
100 and 700 μm:

| Fraction size | SAP (%) | Fraction | mid. cum.<br>% by wt. |
|---|---|---|---|
| 710 μm-850 μm | 1.2 | 850 μm | 100.0 |
| >850 μm | 0.0 | | 100.0 |

TABLE 2C

Product sieving
100 and 600 μm:

| Fraction size | SAP (%) | Fraction | fine cum.<br>% by wt. |
|---|---|---|---|
| 0-45 μm | 0.0 | 45 μm | 0.0 |
| 45 μm-150 μm | 2.8 | 150 μm | 2.8 |
| 150 μm-212 μm | 11.4 | 212 μm | 14.2 |
| 212 μm-300 μm | 21.5 | 300 μm | 35.7 |
| 300 μm-425 μm | 38.0 | 425 μm | 73.7 |
| 425 μm-500 μm | 16.2 | 500 μm | 89.9 |
| 500 μm-600 μm | 8.6 | 600 μm | 98.5 |
| 600 μm-710 μm | 1.4 | 710 μm | 99.9 |
| 710 μm-850 μm | 0.1 | 850 μm | 100.0 |
| >850 μm | 0.0 | | 100.0 |

REFERENCE SIGNS 31 reactants
30 reactor
33 lumps
32 gel bunker
34 conveying means
35 dry cake
35C upper edge
35D thickness of the dry cake 35
36 belt drier
36A drier setup
36F conveyor belt
36U deflecting roll
37 fragments of the dry cake 35
37C upper edge
37D thickness of the fragments 37
F receiving surface
36T support table
36G support grid
36B rods or bars or similar support elements, laterally spaced apart by interspaces, of a support grid 36G
38 comminution arrangement
38.1 milling drum
38.1R working edge
38.1A axis
38.2 further comminution element and/or guide element of the comminution arrangement
H upper working line
h lower working line
R1 direction of rotation of a deflecting roll 36U
R2 direction of rotation of a rotatable shaft ZF1
R radius of the milling drum 38.1
D distance of the milling drum 38.1 from the end of the support
40 conveying screw
41 polymer particles in the main stream
42 pneumatic conveying
43 product stream in pneumatic conveying
39, 45, 47 comminuted (39) and ground (45) and sieved (47) polymer particles
44 grinding
46 sieving apparatus
ZF comminuting mill
ZF1 rotatable shaft of the comminuting mill
ZF2 functional elements of the comminuting mill

The invention claimed is:

1. A belt drier arrangement for drying an aqueous polymer gel and for comminuting the dried polymer gel to give dried polymer particles, having:
a belt drier (36) having a drier setup (36A) and a conveyor belt (36F) for receiving and for drying the aqueous polymer gel to give a dry cake (35) or fragments (37) on a receiving surface (F) of the conveyor belt (36F),
a comminution arrangement (38), disposed downstream of the drier setup in product flow direction, for comminution of the dried polymer gel of the dry cake (35) or fragments (37) to give dried comminuted polymer particles (39),
wherein
the comminution arrangement (38) has a comminutor in the form of a milling drum (38.1) and a support for the dry cake (35) or for the fragments (37) is disposed between the conveyor belt (36F) and the milling drum (38.1), in an extension of the conveyor belt, wherein the support is disposed such that a front distance is left between a front edge of the support and a rear end of the conveyor belt,
the milling drum (38.1) is disposed with an upper working line (H) of a working edge (38.1R) of the milling drum (38.1) at the level of or above a receiving surface (F) of a conveyor belt (36F), for mill processing of the dry cake (35) or of the fragments (37), where the milling drum (38.1) is designed to eject comminuted dried polymer particles (39) of the dry cake (35) or of the fragments (37) in the downward direction.

2. The belt drier arrangement according to claim 1, wherein
the milling drum (38.1) has a rotatable shaft (ZF1) with functional elements (ZF2) and the conveyor belt (36F) has a deflecting roll (36U), the rotatable shaft (ZF1) having been designed to rotate with a direction of rotation (R2) counter to a direction of rotation (R1) of the deflecting roll (36U).

3. The belt drier arrangement according to claim 1, wherein a radius (r) of the milling drum (38.1) is not less than the thickness (35D, 37D) of the dry cake (35) or of the fragments (37).

4. The belt drier arrangement according to claim 1, wherein the upper working line (H) of the milling drum (38.1) is above an upper edge (35C) of the dry cake or above an upper edge (37C) of the fragments (37), and/or a lower working line (H) of the milling drum (38.1) is below a receiving surface (F) of a conveyor belt (36F).

5. The belt drier arrangement according to claim 1, wherein the upper working line (H) of the milling drum (38.1) has an upper distance from the receiving surface (F) of the conveyor belt and the upper distance above the level of the receiving surface (F) of the conveyor belt is at least 5 cm.

6. The belt drier arrangement according to claim 1, wherein an axis (38.1A) of the milling drum (38.1), is at the level of or below the level of a receiving surface (F) of a conveyor belt (36F).

7. The belt drier arrangement according to claim 1, wherein the support is designed as a support table (36T) with a closed support face, where a rear distance (D) is left between a rear edge of the support table (36T) and a front working edge (38.1R) of the milling drum (38.1).

8. The belt drier arrangement according to claim 1, wherein the support takes the form of a support grid (36G) having laterally interspaced support elements (36B).

9. The belt drier arrangement according to claim 1, wherein a front part of the support is designed as a support table with a closed support face and a rear part of the support takes the form of a support grid having laterally interspaced support elements.

10. The belt drier arrangement according to claim 8, wherein functional elements (ZF2) on the milling drum (38.1) can mesh into the interspaces between support elements (36B) of a support grid (36G).

11. The belt drier arrangement according to claim 1, wherein the comminution arrangement, in addition to the milling drum (38.1) and an optional conveying screw (40), has a further comminution element and/or guide element (38.2).

12. The belt drier arrangement according to claim 1, wherein
the comminution arrangement (38), especially the milling drum, is designed to comminute the dry cake to give dried polymer particles, where the comminuted dried polymer particles have a mass-average particle diameter between 0.5 mm and 10 mm.

13. The belt drier arrangement according to claim 1, wherein the comminution arrangement (38) is designed for a dwell time of polymer particles below 90 sec in the comminution arrangement.

14. The belt drier arrangement according to claim 1, wherein the comminution arrangement is designed to comminute the polymer particles at a temperature between 40° C. and 140° C.

15. The belt drier arrangement according to claim 1, wherein
the milling drum (38.1) is designed to rotate (R2) the shaft (ZF1) at a speed of rotation of more than 50 rpm and less than 250 rpm.

16. The belt drier arrangement according to claim 1, wherein
a number of functional elements (ZF2) on the milling drum (38.1) takes the form of a number of rods, teeth, bars, paddle surfaces or toothed, zigzag or knurled elements or edges.

17. The belt drier arrangement according to claim 16, wherein the milling drum (38.1) has a number of functional elements (ZF2) arranged along a basic profile of a spiral to form a working edge (38.1 R), and the spiral especially has a screw flight with a flight angle between 20° and 70°.

18. The belt drier arrangement according to claim 17, wherein the spiral has a single screw flight or the spiral has multiple uniformly directed or opposing screw flights.

19. A method of drying an aqueous polymer gel and of comminuting the dried polymer gel to give dried polymer particles with a belt drier arrangement according to claim 1, having:
a belt drier (36) having a drier setup (36A) and a conveyor belt (36F) for receiving and for drying the aqueous polymer gel to give a dry cake (35) or fragments (37) on a receiving surface (F) of the conveyor belt (36F),
a comminution arrangement (38), disposed downstream of the drier setup in product flow direction, for comminution of the dried polymer gel of the dry cake (35) or fragments (37) to give dried comminuted polymer particles (39), wherein the comminution arrangement (38) has a comminutor in the form of a milling drum (38.1) and a support for the dry cake (35) or for the fragments (37) is disposed between the conveyor belt (36F) and the milling drum (38.1), in an extension of the conveyor belt, wherein the support is disposed such that a front distance is left between a front edge of the support and a rear end of the conveyor belt, and, in the method:
the dried polymer gel of the dry cake (35) is comminuted to give dried comminuted polymer particles (39), where
the dry cake (35) or the fragments (37) are processed by milling with an upper working line (H) of a working edge (38.1R) of the milling drum (38.1) at or above a receiving surface (F) of a conveyor belt (36F) and the milling drum (38.1) ejects the comminuted dried polymer particles (39) of the dry cake (35) or fragments (37) in the downward direction.

20. A production method for production of water-absorbing polymer particles, having the steps of:
polymerizing a monomer solution or suspension to give water-absorbing polymer particles of an aqueous polymer gel, where the solution comprises
a) at least one ethylenically unsaturated monomer which bears acid groups and may have been at least partly neutralized,
b) at least one crosslinker,
c) at least one initiator,
d) optionally one or more ethylenically unsaturated monomers copolymerizable with the monomers mentioned under a) and
optionally one or more water-soluble polymers,
conveying the aqueous polymer gel to a belt drier arrangement,
drying the aqueous polymer gel and comminuting the dried polymer gel to give dried polymer particles with the belt drier arrangement according to claim 1, having:
a belt drier (36) having a drier setup (36A) and a conveyor belt (36F) for receiving and for drying the aqueous polymer gel to give a dry cake (35) or fragments (37) on a receiving surface (F) of the conveyor belt (36F),
a comminution arrangement (38), disposed downstream of the drier setup in product flow direction, for comminution of the dried polymer gel of the dry cake (35) or fragments (37) to give dried comminuted polymer particles (39), wherein
the comminution arrangement (38) has a comminutor in the form of a milling drum (38.1) and a support for the dry cake (35) or for the fragments (37) is disposed between the conveyor belt (36F) and the milling drum (38.1), in an extension of the conveyor belt, wherein the support is disposed such that a front distance is left between a front edge of the support and a rear end of the conveyor belt, and in the method:
the dried polymer gel of the dry cake (35) is comminuted to give dried comminuted polymer particles (39), where
the dry cake (35) or the fragments (37) are processed by milling with an upper working line (H) of a working edge (38.1R) of the milling drum (38.1) at or above a receiving surface (F) of a conveyor belt (36F) and the milling drum (38.1) ejects the comminuted dried polymer particles (39) of the dry cake (35) or fragments (37) in the downward direction, optionally grinding and/or classifying the dried and comminuted polymer particles.

\* \* \* \* \*